US008974930B2

(12) United States Patent
Oguri et al.

(10) Patent No.: US 8,974,930 B2
(45) Date of Patent: Mar. 10, 2015

(54) BATTERY MODULE

(75) Inventors: Kosuke Oguri, Wako (JP); Tsukasa Ohkawa, Wako (JP); Masahiko Natsuume, Wako (JP); Masao Kawata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 13/232,063

(22) Filed: Sep. 14, 2011

(65) Prior Publication Data

US 2012/0064379 A1    Mar. 15, 2012

(30) Foreign Application Priority Data

Sep. 14, 2010 (JP) .................................. 2010-205928

(51) Int. Cl.
| | | |
|---|---|---|
| *H01M 2/12* | (2006.01) | |
| *H01M 10/52* | (2006.01) | |
| *H01M 2/10* | (2006.01) | |
| *H01M 10/6555* | (2014.01) | |
| *H01M 10/647* | (2014.01) | |

(52) U.S. Cl.
CPC .......... *H01M 2/1016* (2013.01); *H01M 2/1077* (2013.01); *H01M 2/1229* (2013.01); *H01M 10/5055* (2013.01); *H01M 10/5032* (2013.01)
USPC .................................. 429/56; 429/53; 429/64

(58) Field of Classification Search
None
See application file for complete search history.

(56) References Cited

U.S. PATENT DOCUMENTS

2003/0010385 A1*  1/2003  Il ................................. 137/493.8
2006/0240318 A1   10/2006  Kim et al.

FOREIGN PATENT DOCUMENTS

| JP | 10-321208 | 12/1998 | |
|---|---|---|---|
| JP | 2003-346749 | * 12/2003 | .............. H01M 2/10 |
| JP | 2006-310309 | 11/2006 | |
| JP | 2009-170258 | 7/2009 | |

OTHER PUBLICATIONS

Japanese Office Action for corresponding JP Application No. 2010-205928, Nov. 13, 2012.

* cited by examiner

*Primary Examiner* — Barbara Gilliam
*Assistant Examiner* — Angela Martin
(74) *Attorney, Agent, or Firm* — Mori & Ward, LLP

(57) ABSTRACT

A battery module includes a plurality of cells and a plurality of holders. The plurality of cells are parallelly arranged in a row at intervals. The plurality of cells have explosion-proof valves which are provided therein and which are capable of opening upon an increase in an inner pressure in the plurality of cells. The plurality of holders are arranged among the cells so as to hold the cells. The holders have holder pieces which are integrally formed therein and which cover at least part of the explosion-valves so as to prevent emissions from the explosion-proof valves from being released in all directions.

10 Claims, 10 Drawing Sheets

FIG. 1

BATTERY MODULE

CROSS-REFERENCE TO RELATED APPLICATIONS

The present application claims priority under 35 U.S.C. §119 to Japanese Patent Application No. 2010-205928, filed Sep. 14, 2010, entitled "Battery Module". The contents of this application are incorporated herein by reference to their entirety.

BACKGROUND OF THE INVENTION

1. Field of the Invention

The present invention relates to a battery module.

2. Discussion of the Background

A conventional battery assembly (battery module) which includes a plurality of square-shaped unit batteries (cells) parallelly arranged in a row, partition walls that maintain the unit batteries at constant intervals, end plates that are closely attached to the outer surfaces of outermost unit batteries, and a connecting rod that connects these components in an integrated manner is well known (see Japanese Unexamined Patent Application Publication No. 2006-310309).

Such a battery assembly (battery module) typically has explosion-proof valves for closing valve orifices respectively provided in the unit batteries (cells). As the inner pressure of the cells increases due to the gasification of an electrolyte, the explosion-proof valves are configured to open to relieve the increased inner pressure.

SUMMARY OF THE INVENTION

According to one aspect of the present invention, a battery module includes a plurality of cells and a plurality of holders. The plurality of cells are parallelly arranged in a row at intervals. The plurality of cells have explosion-proof valves which are provided therein and which are capable of opening upon an increase in an inner pressure in the plurality of cells. The plurality of holders are arranged among the cells so as to hold the cells. The holders have holder pieces which are integrally formed therein and which cover at least part of the explosion-valves so as to prevent emissions from the explosion-proof valves from being released in all directions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

Figure 1:
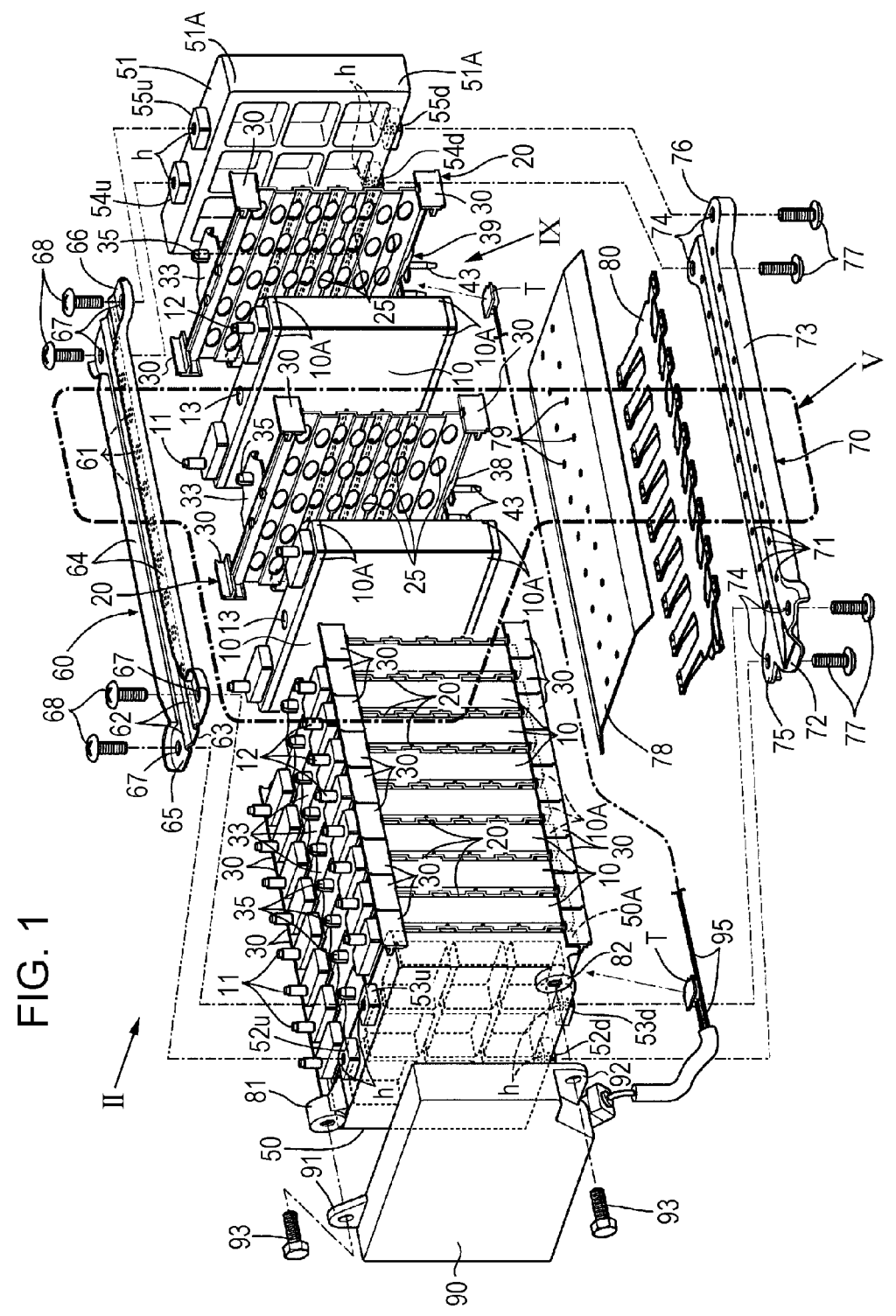

FIG. 1 is a disassembled perspective view of an entire battery module according to one embodiment of the present invention.

DESCRIPTION OF THE EMBODIMENTS

Figure 2:
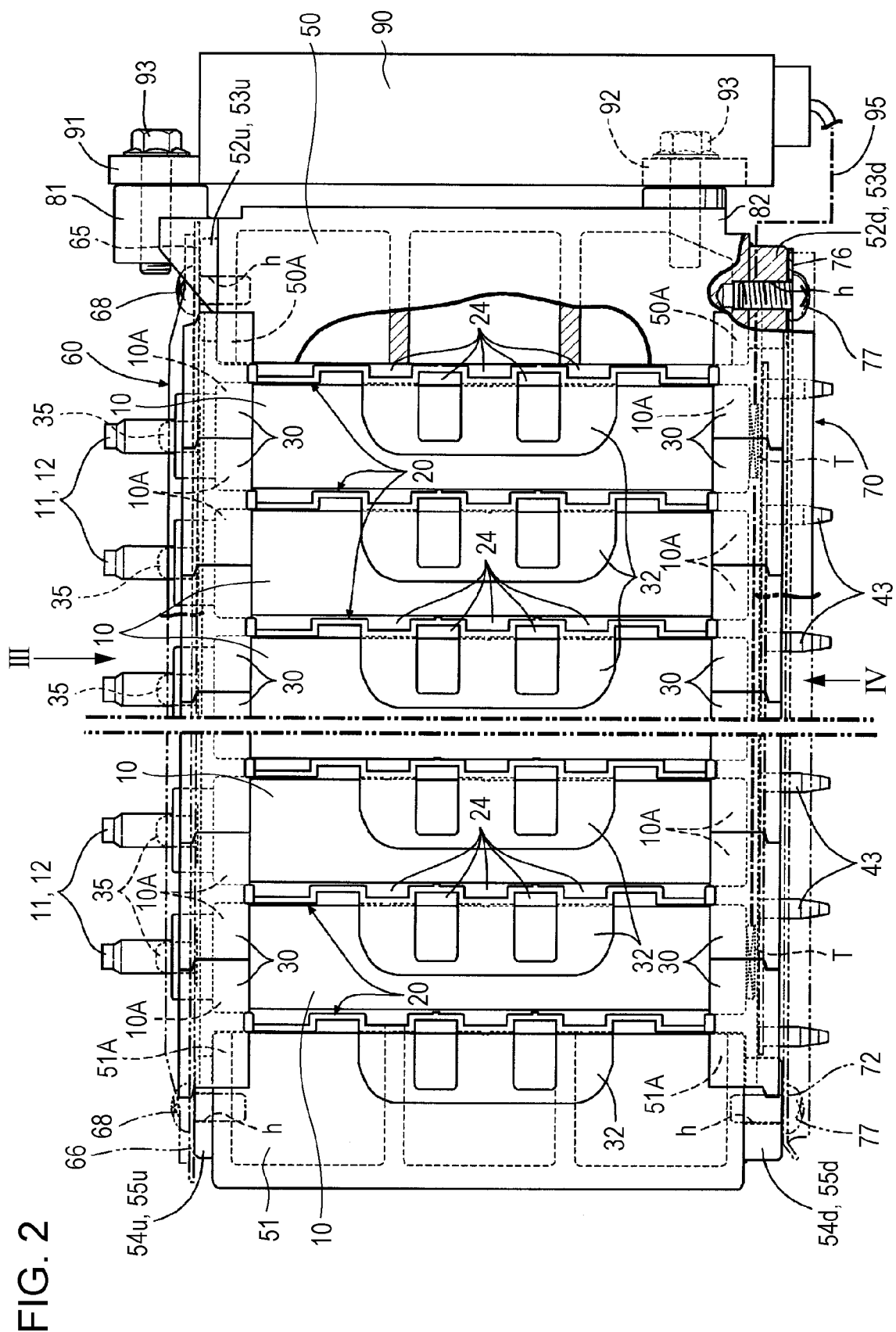
FIG. 2 is a side view of a battery module, as viewed from an arrow II of FIG. 1.

The embodiments will now be described with reference to the accompanying drawings, wherein like reference numerals designate corresponding or identical elements throughout the various drawings.

As shown in FIG. 1, a battery module according to one embodiment of the present invention includes a plurality of square-shaped cells 10 parallelly arranged in a row at intervals, a plurality of holders 20 that are disposed among the cells 10 and on the outside of the outermost cells 10, a square-shaped end plate 50 that is provided on the outside of one of the outermost holders 20, and a square-shaped end plate (base end plate) 51 that is provided on the outside of the other of the outermost holders 20, in which the plurality of cells 10 and holders 20 are closely arranged in parallel to one another in a row and are held between the paired end plates 50, 51, and the end plates 50, 51 are secured in an integrated manner with an upper connecting frame 60 and a lower connecting frame 70 which act as connecting members. In addition, a voltage sensor assembly 90 (voltage sensor) is attached to the outside of the end plate 50.

Each of the square-shaped cells 10 has a known structure which is formed in a flat parallelepiped shape and has positive and negative terminals 11, 12 extending upward from either end of the upper surface thereof and has a valve orifice 14 (see FIG. 7) provided in the middle portion thereof, the valve orifice being closed by an explosion-proof valve 13.

The holders 20 are set in parallel among the neighboring cells 10 and hold the cells 10 at predetermined intervals, thereby providing heat insulating spaces at constant intervals among the cells 10. The structure of the holders 20 is described below with reference to FIGS. 1, 5, 6, and 7.

Figure 5:
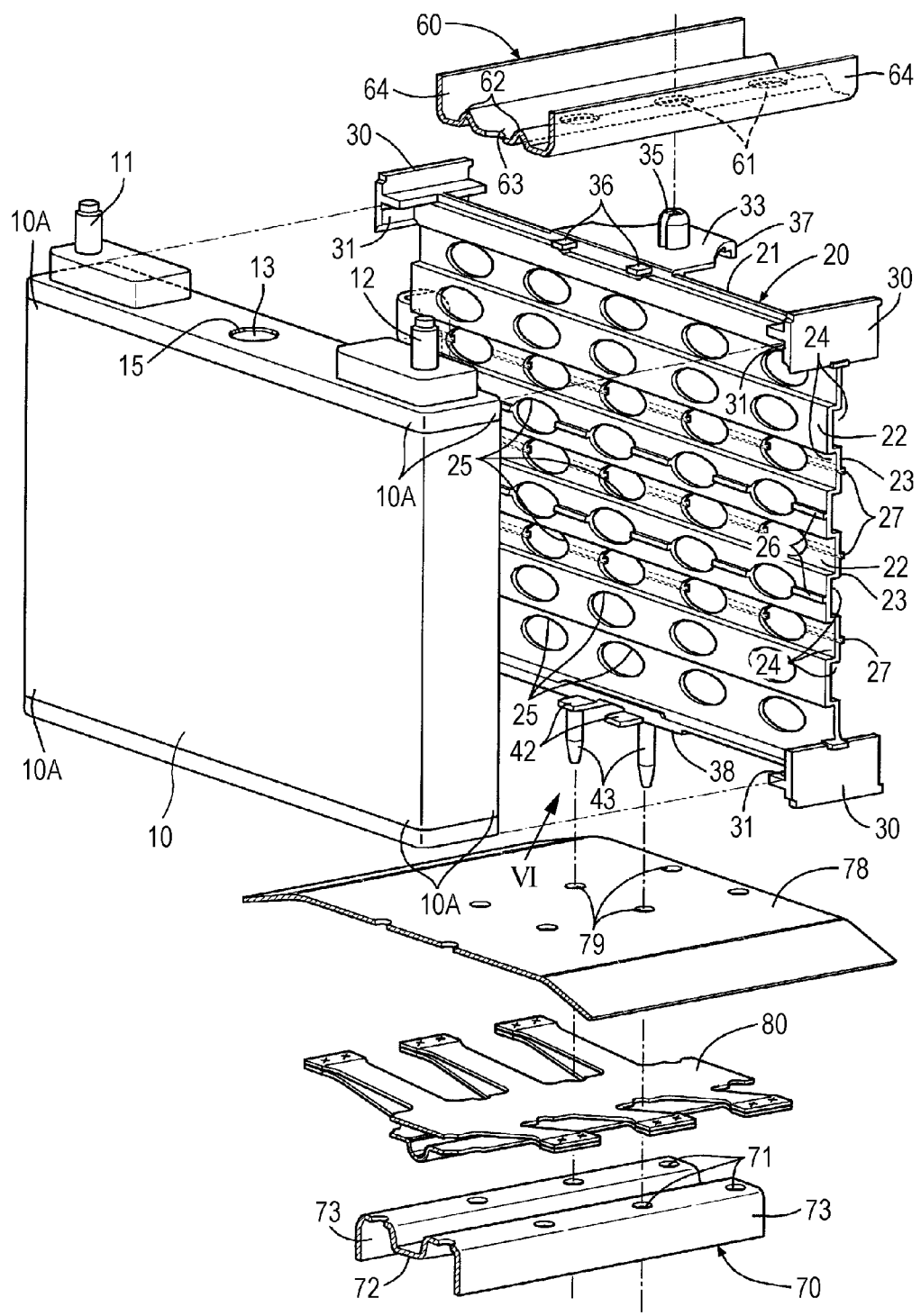
FIG. 5 is an enlarged view of a portion enclosed by a virtual line, as viewed from an arrow V of FIG. 1.
Figure 6:
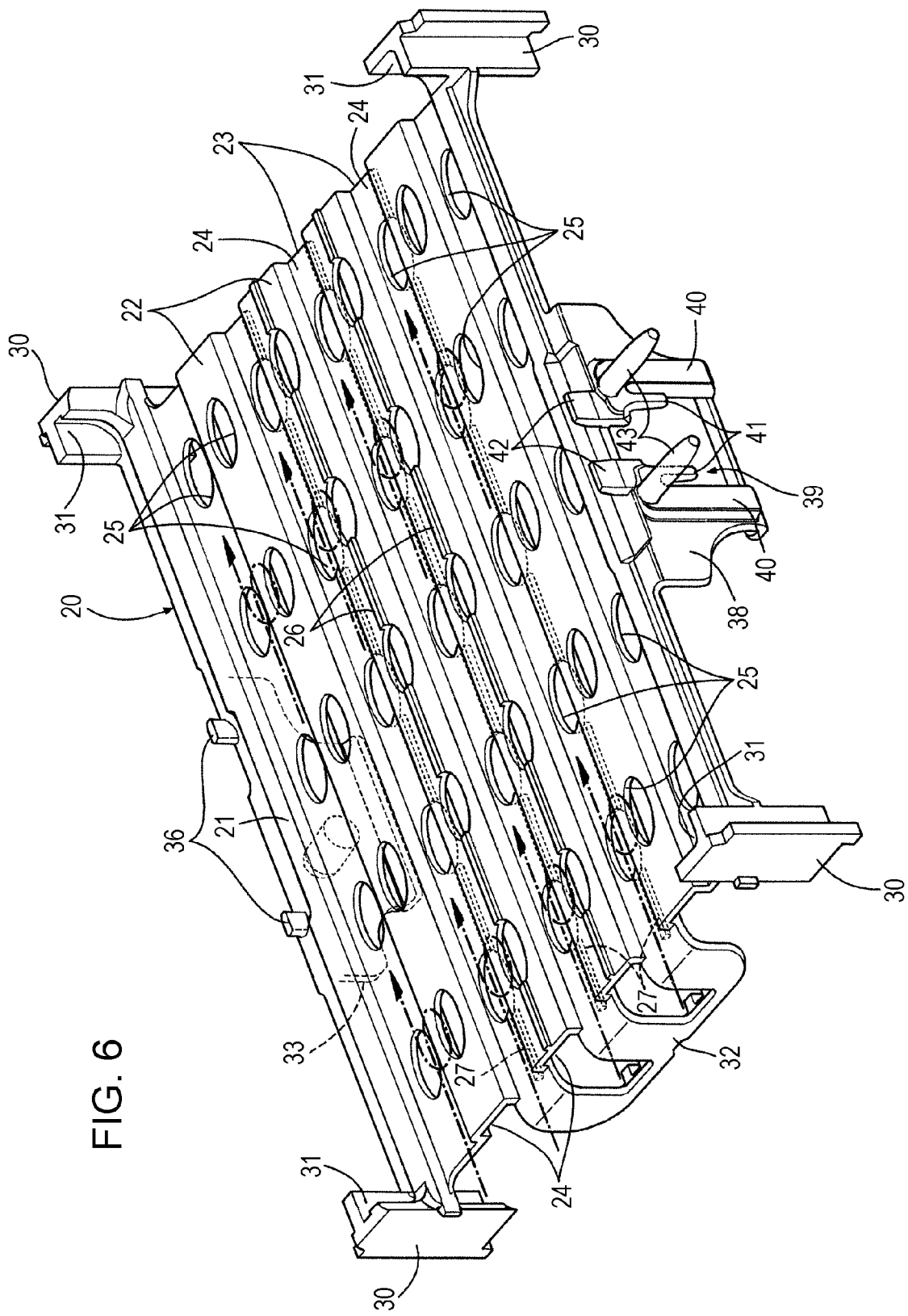
FIG. 6 is a perspective view of a holder, as viewed from an arrow VI of FIG. 5.

A main section 21 of each of the holders 20 is made of a synthetic resin in the form of a square-shaped plate-like structure having substantially the same size as the cells 10. The main section 21 of each of the holders 20 has a plurality of first projecting ridges 22 and a plurality of second projecting ridges 23 alternately arranged in a corrugated shape, the projecting ridges having a U-shaped longitudinal section and extending breadthways parallel to one another. The first projecting ridges 22 and the second projecting ridges 23 each have a breadthways extending cooling passage 24 provided thereinside, which is open at both ends and has a concave-shaped section. Also, the main section 21 has a plurality of through-holes 25 drilled therein for evenly circulating a refrigerant over the entire surface. More specifically, the through-holes 25 are formed in the upper and lower portions of the main section 21 and in the first and second projecting ridges 22, 23, as shown in FIGS. 5 and 6. The through-holes 25 are designed to create a turbulent flow in a refrigerant that flows on the front and back sides of the holder 20 and thereby improve the cooling effect of the cells 10.

Figure 7:
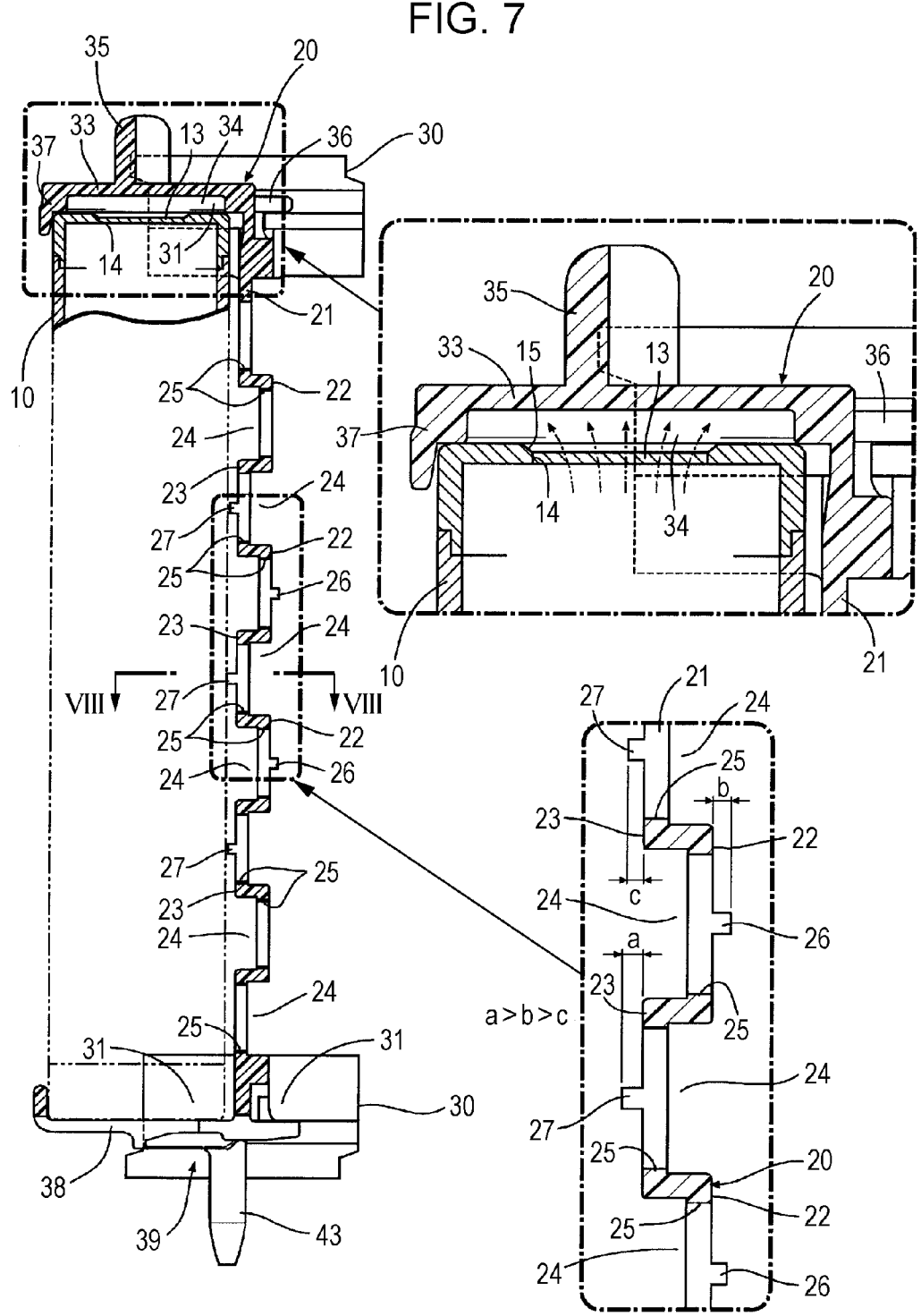
FIG. 7 is an enlarged sectional view taken along line VII-VII of FIG. 3.
Figure 8:
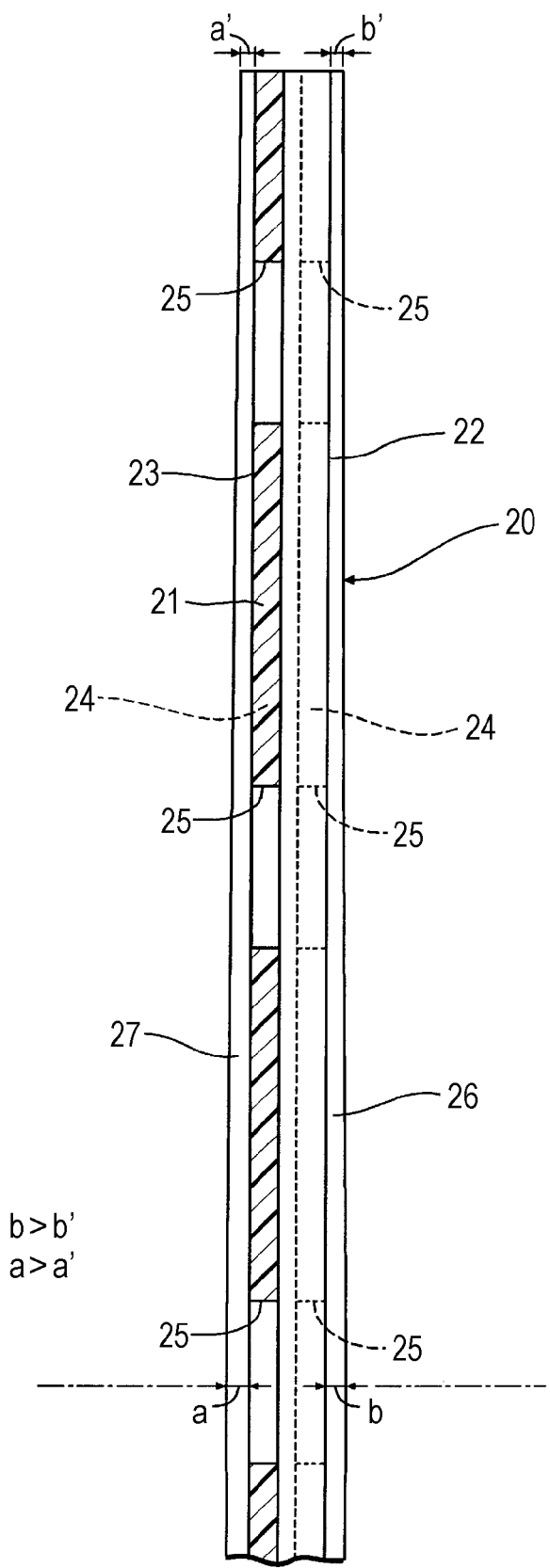
FIG. 8 is an enlarged sectional view taken along line VIII-VIII of FIG. 7.

As shown in FIGS. 5 and 6, some of the plurality of first projecting ridges 22 and the plurality of second projecting ridges 23, located in the middle of the main section 21 of each of the holders 20, have lengthwise extending ribs 26, 27 formed in an integrated manner so as to project from the outer surface at the middle thereof. The ribs 26, 27 are designed to reinforce the holders 20 and maintain the neighboring cells 10 at predetermined intervals, which are held between the holders 20 when the battery module is assembled. As shown in FIGS. 7 and 8, the height of the ribs 26, 27 is configured in such a manner that the height of the rib 27 corresponding to the middle portion of the main section is the largest (a) and the height (b, c) of the ribs 26, 27 located more outward decreases (a>b>c), and the height of the ribs 26, 27 along the lengthwise direction is configured in such a manner that the height at the middle portion is the largest (b, c) and decreases toward the end, namely, the end of the main section 21 and becomes the smallest at the end (a', b'). This configuration of the height of the ribs 26, 27 allows the holders 20 to prevent the cells 10, in particular, their middle sections from swelling out during the assembly of the battery module.

As clearly shown in FIGS. 5 and 6, the main section 21 of the holder 20 has a retaining member 30 secured to each of the four corners thereof. The retaining member 30 consists of an angled component and extends outward from either side of the main section 21 of the holder 20. When the battery module is assembled, retained portions 10A, 10A; 10A, 50A; 10A, 51A formed at the four corners of the cells 10 and the end plates 50, 51 are engaged with angle recesses 31 of the retaining member 30 so that the plurality of cells 10 and the end plates 50, 51 can be arranged in predetermined positions without any misalignment. Also, the main section 21 of the holder 20 has a holding member 32 formed in the middle thereof at the negative terminal side. The holding member is configured to hold the sides of the cells 10.

As shown in FIGS. 5 and 7, the holder 20 has a holder piece 33 integrally formed in the upper surface in the breadthwise middle portion thereof. The holder piece 33 is formed so as to be substantially perpendicular to the front and back sides of the holder 20, namely, substantially horizontal and has an upright wall 37 extending in the direction of the cell 10 so as to have a gate-like section. Also, the holder piece 33 extends like a cantilever in one of the frontward and rearward directions with regard to the holder 20, and, when the battery module is assembled, it is configured to cover the upper surface of the explosion-proof valve 13 that closes the valve orifice 14 in the middle of the upper surface of the adjacent cells 10 so as to produce a space 34 therein. The valve orifice 14 has a funnel-like slanted surface 15 formed on the circumference thereof, which slants upward from the circumference to the upper surface of the cell 10. The holder piece 33 primarily traps emissions, such as a gasified electrolyte, from the opened explosion-proof valve 13. Then the emissions, such as a liquefied electrolyte, move down the slanted surface 15 on the circumference of the valve orifice 15 into the cell 10. In addition, the released emissions are securely contained in the space 34 and thereby prevented from being released to the outside (see FIG. 7).

Also, the holder piece 33 has a locating lug 35 integrally formed on the upper surface thereof, which can fit into a locating hole 61 of the upper connecting frame 60. Furthermore, the holder piece 33 has a mating piece 36 integrally formed in the base thereof, which can be mated with the upper surface of the adjacent cell 10.

As shown in FIG. 6, the holder 20 has a mounting frame 38 for mounting a thermistor T, to be described later, integrally formed on the lower surface thereof in the breadthwise middle portion. The mounting frame 38 is formed in the same direction as the holder piece 33 so as to be substantially perpendicular to the holder, namely, substantially horizontal and extends like a cantilever in one of the frontward and backward directions of the holder 20.

Figure 9:
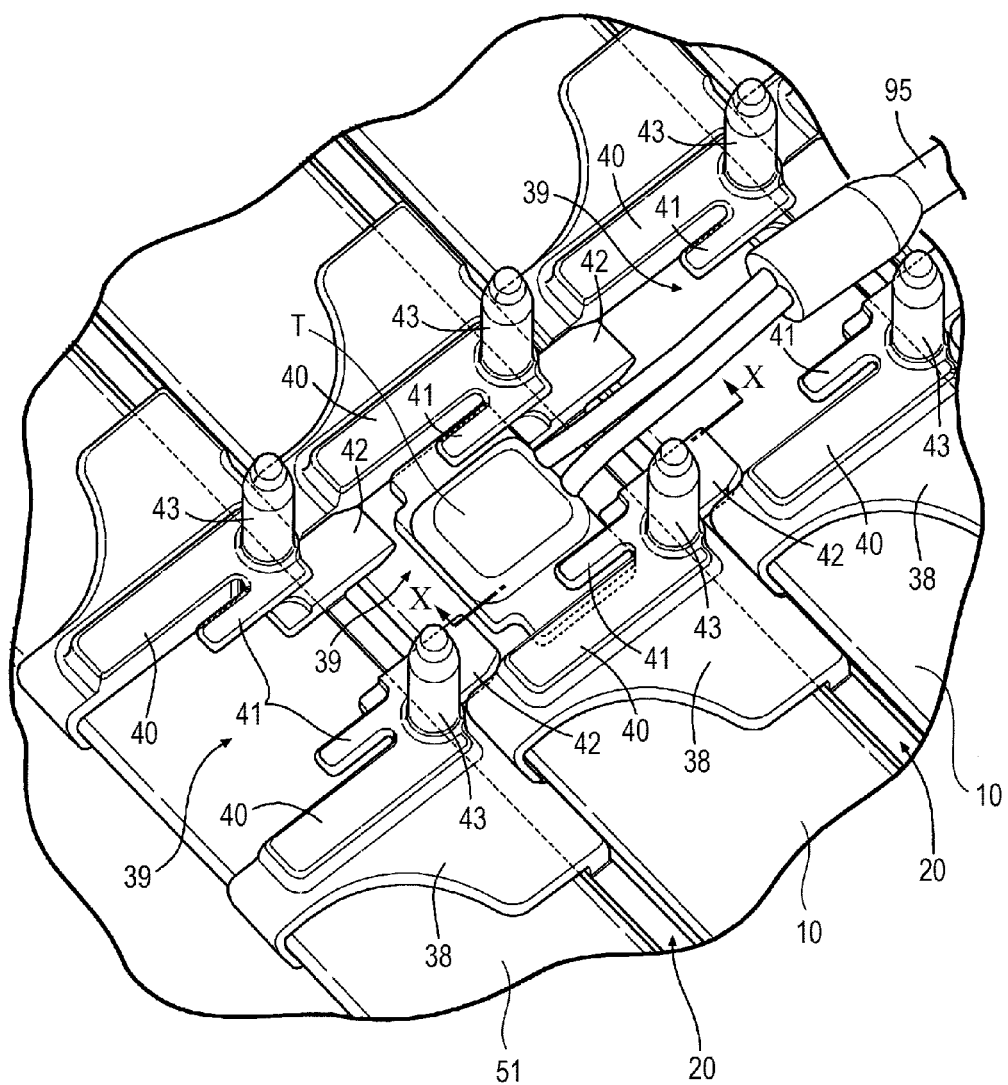
FIG. 9 is an enlarged perspective view, as viewed from an arrow IX of FIG. 1.
Figure 10:
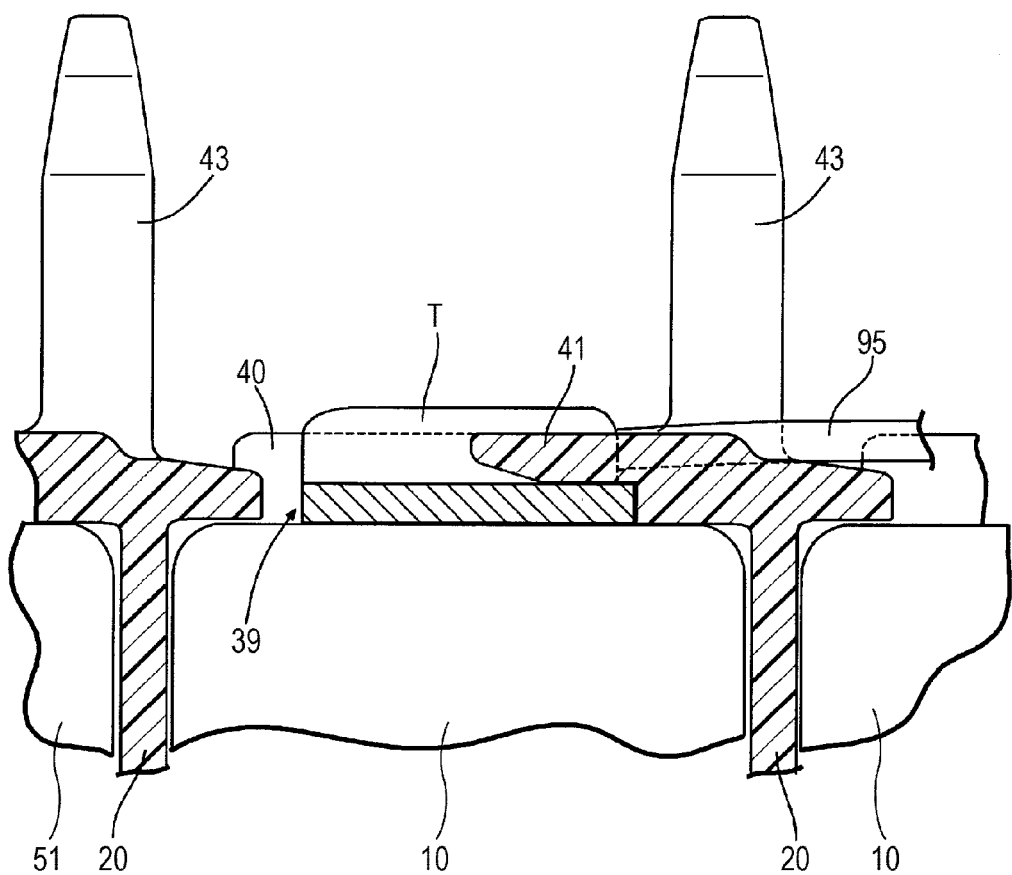
FIG. 10 is an enlarged sectional view taken along line X-X of FIG. 9.

Next, the structure of the mounting frame 38 is described below with reference to FIGS. 6, 9, and 10. The mounting frame 38 has a thermistor mount 39 for detachably mounting a thermistor T on a selective basis, which is used to measure the temperature of the cell 10. Also, the mounting frame 38 has a pair of guides 40 for guiding the thermistor 40 integrally formed in parallel to each other on the outer surface thereof. In addition, a pair of holding members 41 for holding the thermistor T is provided close to the guides 40. Furthermore, a pair of mating pieces 42 is provided in the base of the mounting frame 38 so as to extend to the opposite side of the holding member 41, the mating piece being engaged with the lower surface of the cell 10 adjacent to the holder 20 to prevent the thermistor T from being disconnected. Also, a pair of locating lugs 43 that can fit into locating holes 71 formed in the lower connecting frame 70 to be described later is integrally formed in the pair of guides 40. As shown in FIG. 9, the thermistor T is inserted between the pair of guides 40 and held in place by the pair of holding members 41, so that its temperature sensing part comes into contact with the lower surface of the cell 10 and thereby measures the temperature of the cell 10. The position of the thermistor T can be visually checked with ease from the outside. A lead 95 connected to the thermistor T is connected to the voltage sensor assembly (voltage sensor) 90 to be described later.

As shown in FIG. 1, the pair of end plates 50, 51 that secure the parallelly arranged cells 10 and holders 20 from the outside and hold them therebetween is formed in a flat parallelepiped shape having substantially the same size as the cells 10 and the holders 20, and are arranged so as to be lapped over the outer surfaces of the outermost cells 10 with the holders 20 acting as heat insulating materials provided therebetween.

The pair of end plates 50, 51 are made of metals (for example, magnesium alloy) and have a grid-like structure formed therein so as to be face-to-face with the holders 20, resulting in a reduction in heat transmission area and as a result improving the radiation performance. The holders 20 that function as heat insulating materials are provided between the cells 10 and the end plates 50, 51, respectively, thereby preventing the cells 10 from being overcooled.

Figure 3:
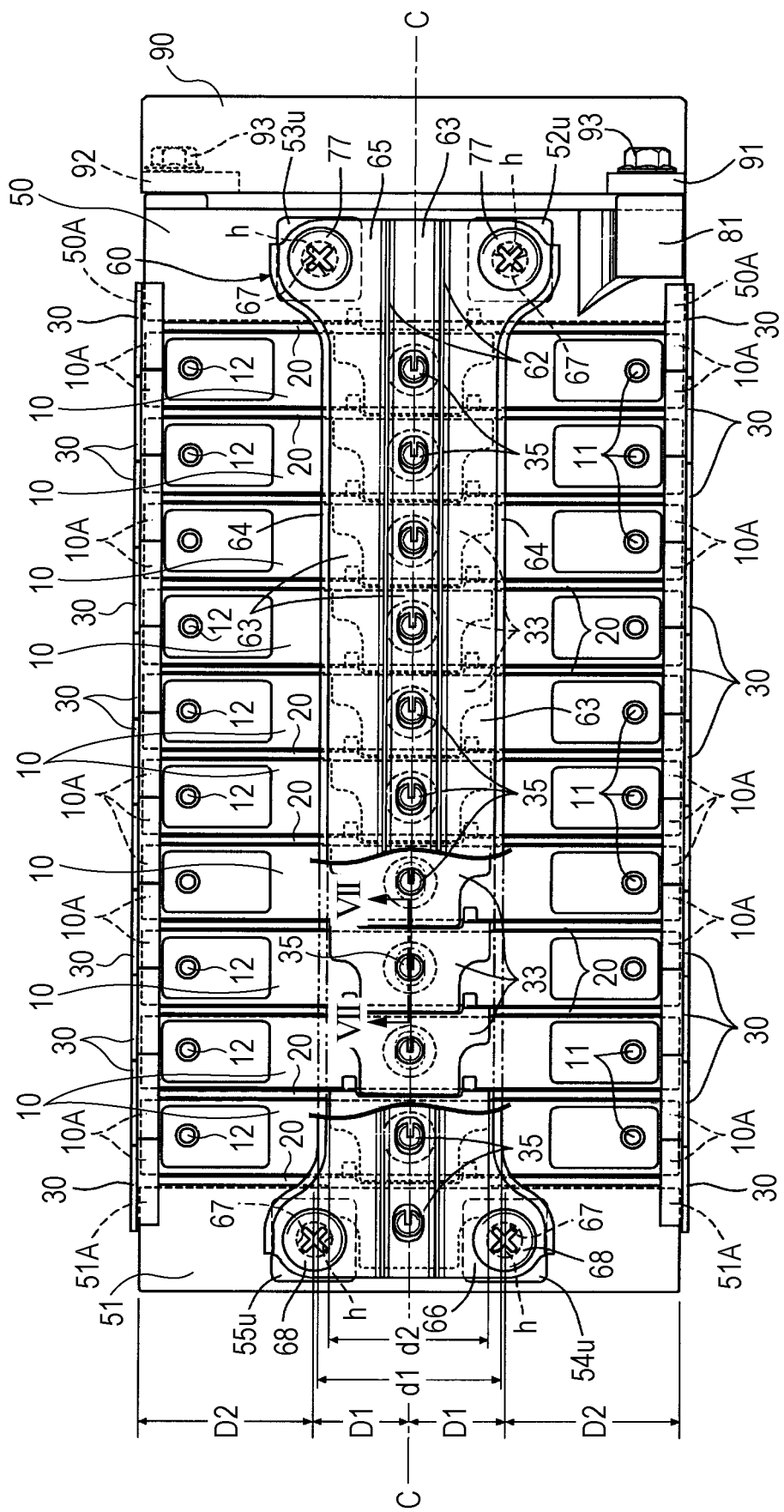
FIG. 3 is a plan view of a battery module, as viewed from an arrow III of FIG. 2.
Figure 4:
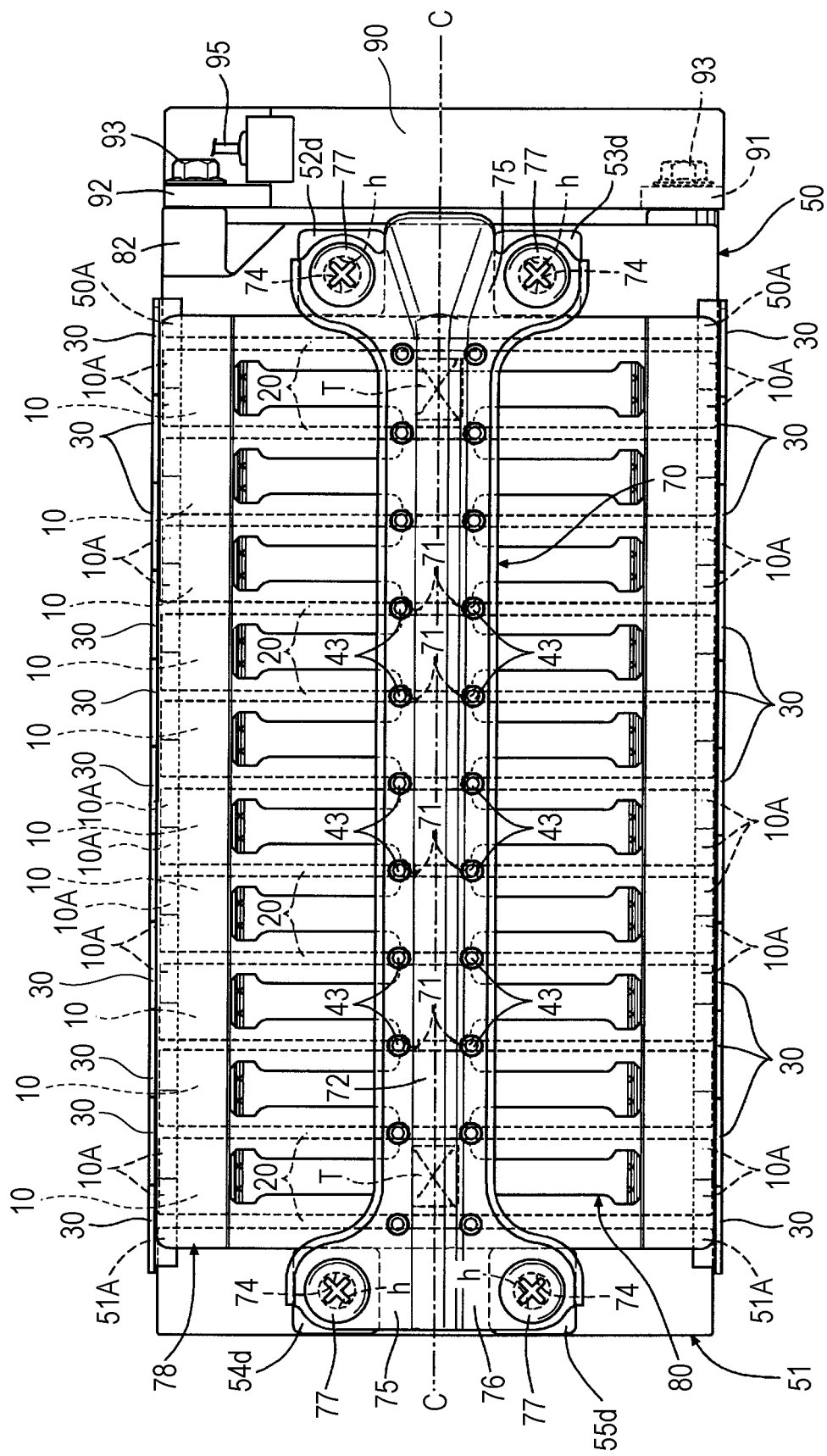
FIG. 4 is a bottom view of a battery module, as viewed from an arrow IV of FIG. 2.

The pair of end plates 50, 51 is connected in an integrated manner through the upper connecting frame 60 and the lower connecting frame 70 to be described later, which act as connecting members. As shown in FIGS. 1, 3, and 4, first and second fixing portions 52$u$, 53$u$ and first and second fixing portions 54$u$, 55$u$ are integrally formed in the upper surface of the pair of end plates 50, 51. Also, first and second fixing portions 52$d$, 53$d$ and first and second fixing portions 54$d$, 55$d$ are integrally formed in the lower surface of the pair of end plates 50, 51. The first fixing portions 52$u$, 54$u$ (52$d$, 54$d$) and the second fixing portions 53$u$, 55$u$ (53$d$, 55$d$) consist of a square-shaped block and are provided so as to be spaced from one another in the breadthwise middle of the end plates 50, 51 and each have a connecting hole h drilled in the center thereof. The connecting hole h is substantially perpendicular to a center line C-C that passes through the center of the plurality of cells 10, the plurality of holders 20, and the pair of end plates 50, 51 and extends lengthwise and faces inward in the vertical direction of the end plates 50, 51. As shown in FIG. 3, a distance D1 between the center of the first fixing portions 52$u$, 54$u$ (52$d$, 54$d$) or the second fixing portions 53$u$, 55$u$ (53$d$, 55$d$) and the center line C-C is configured to be less than a distance D2 between the center of the fixing portions and the outermost surface of the end plates 50, 51 (D1<D2).

As shown in FIGS. 1 and 3, the upper connecting frame 60 is formed of a metallic plate having an elongated shape and has a flat section 63 where the plurality of locating holes 61 are formed in a row and a plurality of ribs 62 are formed in a longitudinal direction so as to be raised and has a flange 64 that integrally stands upright on either side of the flat section 63, resulting in a U-shaped cross-section which provides higher rigidity. Also, the upper connecting frame 60 has connecting lobes 65, 66 integrally formed at both ends thereof so as to project breadthways, each of the connecting lobes 65, 66 having a pair of bolt holes 67 drilled therein.

As shown in FIG. 3, the upper connecting frame 60 is mounted over the upper surface of the parallelly stacked cells 10 and holders 20 so as to be located along the center line C-C that extends longitudinally through the center of the cells 10 and the holders 20. The locating holes 61 of the upper connecting frame 60 fit into the locating lugs 35 formed in the upper surface of the holders 20 so that the upper connecting frame 60 is properly located in relation to the cells 10 and the holders 20. The connecting lobes 65, 66 formed at both ends of the upper connecting frame 60 are arranged so as to be located over the first fixing portions 52$u$, 54$u$ and the second fixing portions 53$u$, 55$u$ formed in the upper surface of the pair of end plates 50, 51, and connecting bolts 68 are inserted through the bolt holes 67 in the connecting lobes 65, 66 and screwed into the connecting holes h of the first fixing portions 52$u$, 54$u$ and the second fixing portions 53$u$, 55$u$, thereby allowing the upper connecting frame 60 to integrally connect and secure the upper portions of the pair of end plates 50, 51.

As shown in FIG. 3, a width $d_1$ of the flat section 63 of the upper connecting frame 60 is configured to be larger than a width $d_2$ of the holder piece 33, so that the flat section 63 covers the entire upper surface of the holder piece 33. With this configuration, the holder piece 33 primarily prevents emissions, such as a gasified electrolyte, released during the opening of the explosion-proof valve 13 from being released to the outside and, in addition, the upper connecting frame 60 secondarily prevents the release of such emissions.

In contrast, as shown in FIGS. 1 and 4, the lower connecting frame 70 is formed in substantially the same shape as the upper connecting frame 60 and has a flat section 72 having a plurality of locating holes 71 formed in two rows therein and has a flange 73 that integrally stands upright on either side of the flat section 72, leading to an inverted U-shaped cross-section which provides higher rigidity. Also, the lower connecting frame 70 has a pair of connecting lobes 75, 76 integrally formed at both ends thereof so as to project breadthways, each of the connecting lobes 75, 76 having bolt holes 74 drilled therein.

As shown in FIGS. 1 and 4, the cells 10 and the holders 20 that are alternately arranged in parallel in a row have a plate-like cover plate 78 laid thereunder, which in turn has a rib-shaped leaf spring 80 laid thereunder. In addition, the cells 10 and the holders 20 have the lower connecting frame 70 laid thereunder with the cover plate 78 and the leaf spring 80 therebetween. The lower connecting frame 70 allows the lower portions of the pair of end plates 50, 51 to be integrally connected. As shown in FIG. 4, the lower connecting frame 70 is laid underneath the parallelly stacked cells 10 and the holders 20 with the cover plate 78 and the leaf spring 80 therebetween so as to be located along the center line C-C that extends longitudinally through the center of the cells 10 and the holders 20. The locating lugs 43 of the mounting frame 38 fit into the locating holes 71 through the through-holes 79 of the cover plate 78 and the leaf spring 80 (see FIG. 5). With this arrangement, the cells 10 and the holders 20 are properly located in relation to the lower connecting frame 70. The connecting lobes 75, 76 formed at both ends of the lower connecting frame 70 are arranged so as to be located over the first fixing portions 52$d$, 54$d$ and the second fixing portions 53$d$, 55$d$ formed in the lower surface of the pair of end plates 50, 51, and connecting bolts 77 are inserted through the bolt holes 74 in the connecting lobes 75, 76 and screwed into the connecting holes h of the first fixing portions 52$d$, 54$d$ and the second fixing portions 53$d$, 55$d$, thereby allowing the lower connecting frame 70 to integrally connect and secure the lower portions of the pair of end plates 50, 51.

As a consequence, the pair of end plates 50, 51 that hold the parallelly stacked cells 10 and the holders 20 therebetween are integrally connected and secured with the upper connecting frame 60 and the lower connecting frame 70 which act as connecting members. As shown in FIG. 3, with this configuration, since the distance D1 between the center of the first fixing portions 52$u$, 54$u$ (52$d$, 54$d$) or the second fixing portions 53$u$, 55$u$ (53$d$, 55$d$) and the center line C-C of the cells 10 and the holders 20 is configured to be less than a distance D2 between the center of the fixing portions and the outermost surface of the end plates 50, 51 (D1<D2), the upper connecting frame 60 and the lower connecting frame 70 can effectively prevent the cells 10 from swelling due to an increase in inner pressure (the middle portions sustain the largest swelling or deformation).

As shown in FIG. 1, the voltage sensor assembly 90 is attached to the outer surface of the end plate 50. The voltage sensor assembly 90 is formed in a flat parallelepiped shape which is somewhat smaller than the end plate 50 and has lower heat conductivity and smaller size than the end plate 50. Also, the voltage sensor assembly 90 has mounting tabs 91, 92 projecting from the diagonally located positions thereof. The end plate 50 has mounting bosses 81, 82 projecting from the diagonally located positions thereof, the mounting bosses 81, 82 corresponding to the mounting tabs 91, 92, respectively. A connecting bolt 93 is inserted through the mounting tabs 91, 92 and screwed into the mounting bosses 81, 82, thereby securing the voltage sensor assembly 90 to the outer surface of the end plate 50 with a clearance provided.

The end plate 50 is a rigid member that is shared by the casing of the voltage sensor assembly 90, contributing to an improvement in rigidity of the voltage sensor assembly 90. Also, although the voltage sensor assembly 90 generates heat emission during the charging or discharging, the end plate 50 can absorb the heat and thereby help the heat-sensitive voltage sensor assembly 90 dissipate the heat.

As shown in FIG. 1, the thermistors T are mounted on the holders 20 on a selective basis. In this embodiment, the thermistors T are mounted on the mounting frames 38 of the outermost holders 20, namely, the holder 20 between the cell 10 and the end plate 50 and the holder 20 between the cell 10 and the end plate 51, respectively. The leads 95 connected to the thermistors T are attached to the voltage sensor assembly 90 for the measurement of battery module temperatures.

When the explosion-proof valve 13 is opened as a result of an increase in inner pressure of the cells, the holder piece 33 provided in the holder 20 can prevent gasified emissions from the cell 10 from being released in all directions.

The upper connecting frame 60 that connects the plurality of cells 10 with the holders 20 thereamong is located above the holder piece 33 and therefore can secondarily trap the missions that escape from the holder piece 33, thereby further ensuring that the emissions are prevented from being released.

The upper connecting frame 60 extends along the longitudinal direction of the plurality of cells 10 in a row and has the flat section 63 that covers the plurality of holder pieces 33, thereby limiting the movement of the holder pieces 33 and preventing damage to the holder pieces 33. With this arrangement, the holder pieces 33 can primarily prevent the emissions from being released, and in addition the upper connecting frame 60 can secondarily prevent the missions, thereby further ensuring that the emissions are prevented from being released.

The width $d_1$ of the flat section 63 in the upper connecting frame 60 is configured to be greater than the width $d_2$ of the holder pieces 33, which allows the upper connecting frame 60 to trap the missions that escape from the holder pieces 33.

The holder 20 has the cooling passages 24 in which a refrigerant is circulated, which allows the cooled holder pieces 33 to cool the gasified emissions from the cells 10 into the liquefied emissions, thereby heightening the release effect.

The holder 20 has the plurality of through-holes 25 drilled therein for creating a turbulent flow in the refrigerant flowing in the cooling passages 24, thereby more effectively cooling the holder 20 through the refrigerant.

The explosion-proof valve 13 and the holder piece 33 have the space 34 formed therebetween, which makes it easier to contain the liquefied emissions within the space 34, thereby preventing corrosion of other battery module components.

The valve orifice 14 that closes the explosion valve 13 has the slanted surface 15 formed on the circumference thereof, which slants upward from the circumference to the upper surface of the cell 10, allowing the holder piece 33 to trap the emissions from the valve orifice 14 and liquefy the emissions. Then, the liquefied emissions are configured to move down the slanted surface 15 into the cell 10, thereby preventing the emissions from being released to the outside as well as preventing corrosion of other battery module components.

Also, heat insulating layers of the holders 20 acting as heat insulating components are formed among the cells 10 and the end plates 50, 51, which prevent the cells 10 adjacent to the end plates 50, 51 from overcooling as compared with the remaining cells 10, thereby preventing variations in deterioration rate of the cells 10 due to changes in temperature of the cells 10 in a row as well as improving the battery module performance and life. In addition, the heat insulating component made of the holder 20 is formed of a plate-like component, which narrows the distance among the cells 10 and thereby prevents the longitudinal dimension of the cells 10 in a row from becoming larger. Also, the refrigerant flows in the cooling passages provided in the heat insulating components, which further enhances the heat insulating effect. Furthermore, the holders 20 can maintain the cells 20 at constant intervals and insulate heat among the cells 10. The holders 20 are the same as the heat insulating components, thereby reducing the number of the components used in the module. The cells 10 and the pair of end plates 50, 51 can be held by the heat insulating components 20 and the holders 20 which are equal to one another and have retained portions of substantially similar shape, which simplify and ensure the holding structure.

The pair of end plates 50, 51 has a grid-like structure opposed to the holders 20, which reduces heat transmission areas among the end plates 50, 51 and the cells 10 and thereby improving the heat insulating effect among them. In addition, the voltage sensor assembly 90 is mounted on the end plate 50 on its side opposite to a side face-to-face with the holder 20, and the end plate 50 has greater heat conductivity and size than the voltage sensor assembly 90, causing the end plate 50 of a greater heat mass to absorb the heat from the heat-generating voltage sensor assembly 90 and thereby prevent overheating of the voltage sensor assembly 90.

According to the embodiment of the present invention, a battery module has a plurality of cells parallelly arranged in a row at intervals and a plurality of holders that are arranged among the cells so as to hold the cells. The cells have explosion-proof valves provided therein which open as an inner pressure in the cells increases and the holders have holder pieces integrally formed therein, which cover at least part of the explosion-valves so as to prevent emissions from the opened explosion-proof valves from being released in all directions. Accordingly, when the explosion-proof valves open due to an increase in inner pressure of the cells, emissions such as a gasified electrolyte can be prevented from being released in all directions.

In the embodiment, the cells may be connected through a connecting member to one another with the holders therebetween, and the connecting member may be located above the holder pieces. Accordingly, the connecting member can secondarily trap the emissions that escape from the holder pieces, thereby further ensuring that the emissions are prevented from being released.

In the embodiment, the connecting member may have a flat section that extends along the plurality of cells arranged in a row and covers the plurality of holder pieces. Accordingly, the connecting member can limit the movement of the holder pieces and prevent damage to the holder pieces. Consequently, the holder pieces can primarily prevent the release of the emissions and the connecting member can secondarily prevent the release of the emissions, thereby more reliably preventing the release of the emissions.

In the embodiment, a width of the flat section of the connecting member may be larger than a width of the holder piece. Accordingly, the connecting member can trap the emissions that escape from the holder pieces.

In the embodiment, the holder may have a cooling passage in which a refrigerant is circulated. Accordingly, the cooled holder pieces can cool down gasified emissions from the cells into liquefied emissions, thereby improving the effect of preventing the release.

In the embodiment, the holder may have a plurality of through-holes drilled therein which create a turbulent flow in the refrigerant flowing in the cooling passage. Accordingly, the holders can be more effectively cooled down.

In the embodiment, a space may be formed between the explosion-proof valve provided in the cell and the holder piece provided in the holder and the space may be partitioned by an upright wall extending from the holder piece to the cell. Accordingly, the liquefied emissions are contained in the space, thereby preventing other battery module components from corroding.

In the embodiment, a valve orifice closed by the explosion-proof valve may be opened in the upper surface of the cell and may have a slanted surface formed on the circumference thereof, which slants upward from the circumference to the upper surface of the cell. Accordingly, the emissions released from the valve orifice are trapped and liquefied by the holder piece, and the liquefied emissions move down the slanted surface into the cell, thereby preventing the emissions from being released to the outside and preventing corrosion of other battery module components.

The present invention is typically described with reference to, but not limited to, the foregoing preferred embodiments. Various modifications are conceivable within the scope of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A battery module comprising:
a plurality of cells parallelly arranged in a row at intervals, the plurality of cells having explosion-proof valves which are provided therein and which are capable of opening upon an increase in an inner pressure in the plurality of cells;
a plurality of holders that are arranged among the cells so as to hold the cells, the holders having holder pieces which are integrally formed therein and which cover at least part of the explosion-proof valves; and
a connecting member connecting the cells to one another with the holders therebetween, the holder pieces being provided between the connecting member and the cells,
wherein the holder piece is provided between the explosion-proof valve and the connecting member.

2. The battery module according to claim 1,
wherein the cells are arranged in a row at intervals in a first direction, and
wherein the connecting member has a flat section that extends in the first direction and that covers the plurality of holder pieces.

3. The battery module according to claim 2,
wherein the cells include surfaces on which the explosion-proof valves are provided,
wherein a second direction is defined along the surfaces of the cells and perpendicular to the first direction, and
wherein a width of the flat section of the connecting member in the second direction is larger than widths of the holder pieces in the second direction.

4. The battery module according to claim 1,
wherein the cells include surfaces on which the explosion-proof valves are provided,
wherein the cells are arranged in a row at intervals in a first direction,
wherein a second direction is defined along the surfaces of the cells and perpendicular to the first direction, and
wherein each of the holders has a cooling passage in which a refrigerant is circulated, the cooling passage extending in the second direction.

5. The battery module according to claim 4,
wherein each of the holders has a plurality of through-holes drilled therein to create a turbulent flow in the refrigerant flowing in the cooling passage.

6. The battery module according to claim 1,
wherein a space is formed between each of the explosion-proof valves provided in each of the cells and the corresponding holder piece provided in each of the holders, and the space is partitioned by an upright wall extending from the corresponding holder piece to the cell.

7. The battery module according to claim 1,
wherein a valve orifice closed by each of the explosion-proof valves is opened in an upper surface of each of the cells and has a slanted surface formed on a circumference thereof, which slants upward from the circumference to the upper surface of each of the cells.

8. The battery module according to claim 1,
wherein each of the holder pieces has a mating piece formed on a base of the each of the holder piece, and the mating piece is capable of mating with an upper surface of a cell among the plurality of cells adjacent to the mating piece.

9. The battery module according to claim 1,
wherein the connecting member connects a pair of end plates to each other, and
wherein the pair of end plates are provided on both ends of the plurality of cells, respectively.

10. The battery module according to claim 1,
wherein the cell has positive and negative terminals, and
wherein the explosion-proof valve and the connecting member are provided between the positive and negative terminals.

* * * * *